(12) United States Patent
Xin et al.

(10) Patent No.: US 8,582,255 B2
(45) Date of Patent: Nov. 12, 2013

(54) CORE-SATURATED SUPERCONDUCTIVE FAULT CURRENT LIMITER AND CONTROL METHOD OF THE FAULT CURRENT LIMITER

(75) Inventors: Ying Xin, Beijing (CN); Weizhi Gong, Beijing (CN); Xiaoye Niu, Qinhuangdao (CN); Zhengjian Cao, Beijing (CN)

(73) Assignee: Innopower Superconductor Cable Co., Ltd. (CN)

( * ) Notice: Subject to any disclaimer, the term of this patent is extended or adjusted under 35 U.S.C. 154(b) by 494 days.

(21) Appl. No.: 12/596,645

(22) PCT Filed: Apr. 17, 2008

(86) PCT No.: PCT/CN2008/000792
§ 371 (c)(1),
(2), (4) Date: Aug. 24, 2010

(87) PCT Pub. No.: WO2008/125022
PCT Pub. Date: Oct. 23, 2008

(65) Prior Publication Data
US 2010/0311596 A1    Dec. 9, 2010

(30) Foreign Application Priority Data

Apr. 17, 2007  (CN) .......................... 2007 1 0097088
Apr. 17, 2007  (CN) .......................... 2007 1 0097089
Mar. 28, 2008  (CN) .......................... 2008 1 0084283

(51) Int. Cl.
*H01F 6/06*    (2006.01)

(52) U.S. Cl.
USPC .......................................... 361/19; 505/163

(58) Field of Classification Search
USPC ...................................... 361/19; 505/150, 163
See application file for complete search history.

(56) References Cited

U.S. PATENT DOCUMENTS

| | | | |
|---|---|---|---|
| 4,152,637 A | 5/1979 | Oberbeck et al. | |
| 4,930,034 A * | 5/1990 | Kusserow et al. | 361/19 |
| 5,532,638 A * | 7/1996 | Kubo et al. | 327/368 |
| 6,157,094 A * | 12/2000 | Gamble et al. | 307/113 |
| 2004/0155538 A1* | 8/2004 | Kalsi | 310/52 |

FOREIGN PATENT DOCUMENTS

| | | |
|---|---|---|
| CN | 1728495 | 2/2006 |
| EP | 1 841 035 A2 | 10/2007 |
| JP | 2003-243118 | 8/2003 |
| JP | 2006-504254 | 2/2006 |
| WO | WO 99/60585 | 11/1999 |
| WO | WO 2004/036715 A1 | 4/2004 |
| WO | WO 2007/029224 A1 | 3/2007 |

* cited by examiner

*Primary Examiner* — Danny Nguyen
(74) *Attorney, Agent, or Firm* — David B. Tingey; Kirton | McConkie (57) ABSTRACT

A core-saturated superconductive fault current limiter and a control method of the fault current limiter. The fault current limiter includes a superconductive magnet (2), a core (4), an AC winding (5), a cryostat system, a monitor system (7) and a DC control system (6). The output of the DC control system (6) is connected to the two terminals of the superconductive magnet (2). The DC control system (6) is also connected to the monitor system (7). The core (4) has an unequal section core structure. The control method includes: controlling the current which is flowing through the superconductive magnet (2) for limiting the fault current in the power net (1) in the case of a short circuit fault event.

20 Claims, 8 Drawing Sheets

CORE-SATURATED SUPERCONDUCTIVE FAULT CURRENT LIMITER AND CONTROL METHOD OF THE FAULT CURRENT LIMITER

FIELD OF THE INVENTION

This invention relates to a core-saturated superconductive fault current limiter, which has a superconductive magnet, a reactance system that is an iron core and an AC winding, a cryostat system, and a monitoring system, and further includes a DC control system. The DC control system is connected to the superconductive magnet at both ends, and connected to the monitoring system through a data cable. The iron core of the reactance system adopts the iron core structure with unequal cross-section. This invention can automatically regulate the magnitude of the current in the superconductive magnet during the stable operation of the protected power grid lines, and can automatically identify the fault when a short-circuit fault event occurs at the protected power grid positions. It can greatly improve the current limiting efficiency of the current limiter by cutting off the current in the superconductive magnet such that all iron cores of the limiter are engaged in limiting the fault current in the power grid. At the same time, it reduces the effect of magnetic leakage on iron cores by varying the structure, shape and size of the iron cores to redistribute the magnetic potential on the iron cores. In the case that excitation magnetic field stays unchanged or decreasing, the designed saturation of the iron cores can be realized.

The present invention is mainly applied for short-circuit current protection in power transmission, distribution networks and power apparatuses, especially for short-circuit current protection in networks with high voltage or super high voltage.

BACKGROUND OF THE INVENTION

With the development of superconductor technology, it becomes feasible to install superconductive fault current limiters in a power grid used to limit the short-circuit fault current. At present, among all kinds of superconductive fault current limiters developed all over the world, the core-saturated superconductive fault current limiter is most desirable due to the following properties: incorporating detection, initiation of limiting action and current limitation together, and no quench of the superconductivity in the process of current limiting.

The traditional core-saturated superconductive fault current limiter is composed of four parts: an iron core group, an AC winding, a superconductive magnet (namely a superconductive winding), and a direct current (DC) power supply. The superconductive magnet provides excitation for two parallel iron cores. Two AC coils connected in series are wound on two iron cores respectively to cancel the magnetic fields generated in the center column so as to minimize the effect of the AC inductance voltage on the DC superconductive windings. When the current limiter operates normally, the DC excitation causes the iron cores to be in the deep saturation. Iron cores produce small inductive impedance in the AC winding so that there is no effect on the power grid. In the state of the fault current limiting, the super high short-circuit current drives one iron core out of saturation in a half-wave and the magnetic field in the other iron core increases to realize the current limiting by a single iron core (the reactor in the enhanced magnetism state is not engaged in the current limiting). This is so-called passive fault current limiting.

Although the passive fault current limiting can indeed limit the fault current, it has the following obvious short-comings: 1) it does not fully utilize all of the iron cores for limiting the fault current, thus demands heavier iron cores and larger size of the AC winding to produce the desired current limiting effects; 2) the DC side has to be subject to high inductive voltage during the state of the fault current limiting; and 3) the DC power supply must be a constant power supply. Otherwise, the efficiency of current liming will be reduced if there is interference in the power supply.

Figure 5:
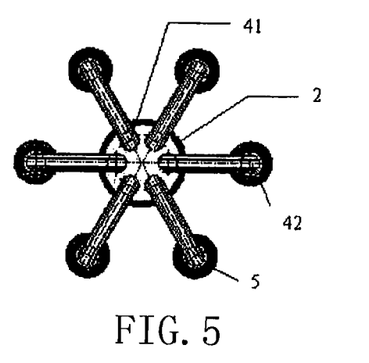
FIG. 5 is a schematic diagram of the structure of a loose coupling six-iron core structure of prior art.
Figure 6:
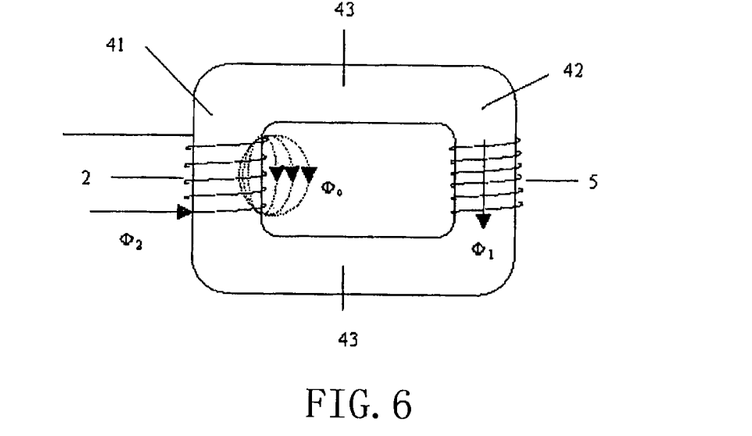
FIG. 6 shows a schematic diagram of the rectangular-shape iron core excitation of prior art.

Furthermore, for the superconductive fault current limiters on a high voltage grid, AC windings are at high voltage level while iron cores and superconductive magnets are at low voltage level. Safe insulation distances are required between AC windings, between AC windings and the iron cores, and between superconductive magnets. For this reason, the loose coupling structure shown in FIG. 5 is generally adopted, that is, superconductive magnet 2 and the AC winding 5 are on different iron core posts of the same iron core window. Since the iron cores operate in the nonlinear segment of the B-H magnetization curve of iron core materials for a certain time period or all time periods, which falls in the range of saturation or deep saturation. Therefore, in the loose coupling structure, magnetic leakage is inevitable. This phenomenon becomes aggravated as the degree of saturation increases. FIG. 6 shows the schematic diagram of the rectangular-shape iron core excitation of prior art. The iron core part wound by the superconductive magnet 2 is called as an excitation segment 41. The iron core part wound by the AC winding 5 is called as a working segment 42. The other part connected with the excitation segment 41 and the working segment 42 is called as a conduction segment 43. When the excitation current in the superconductive magnet 2 is low, the magnetic field in the iron cores is weak. The iron cores are in the unsaturated state, with lower magnetic leakage flux. The magnetic flux in the working segment 42 and the excitation segment 41 are approximately same. If the excitation current is increased, the magnetic leakage increases. Because the magnetic leakage increases, the ratio of magnetic potential on the excitation segment 41 to the total magnetic potential produced by windings is also increasing. As a result, the magnetic potential on the working segment 42 reduces relative to that on the excitation segment 41. It is needed to increase excitation current to reach a certain degree of saturation, and it is difficult to reach a certain degree of saturation even with increased excitation current.

Consequently, the traditional core-saturated superconductive fault current limiter has been considered as a current limiting technology with higher cost, heavier weight and the required power supply technology is harder to implement and is impractical in reality.

SUMMARY OF THE INVENTION

The purpose of this invention is to overcome the deficiencies and shortcomings of existing technologies. A core-saturated superconductive fault current limiter and its control method are provided. The power electronic control technology is used to turn passive current limiting into active current limiting. At the same time, the effect of magnetic leakage on iron cores is reduced by varying the structure, shape and size of the iron cores, to redistribute the magnetic potential on the iron cores. In the case that excitation magnetic potential stays unchanged or decreasing, the designed saturation of the iron cores can be realized. The core-saturated superconductive fault current limiter according to the present invention has small size, high current limiting efficiency, rapid recovering properties, and no inductive over high voltage damage etc and has better applicability.

To achieve the above purpose, this invention provides a core-saturated superconductive fault current limiter, which comprises a superconductive magnet, a reactance system that is an iron core and an AC winding, a cryostat system, a monitoring system, that is characterized by further including a DC control system and the DC control system is connected to the superconductive magnet at both ends, and connected with the monitoring system through a data cable. The iron core of the reactance system adopts the iron core structure with unequal cross-section.

The DC control system comprises:

a DC power supply module, which has an output terminal;

a magnetic energy absorbing module connected with the output terminal of the DC power supply module, which consists of an absorption branch and a follow current branch. The absorption branch is connected with the superconductive magnet in series, in which the current flows in single direction. The follow current branch is connected in parallel with the series circuit that consists of the absorption branch and the superconductive magnet, and its current flows in a direction opposite to that in the absorption branch;

a control module, which connects the state data lines of the controllable power electronic switches in the power mutual inductor of the power grid, DC power supply module, and the magnetic energy absorbing module through signal lines, and which receives electrical measurement signals in the power grid, receives and transmits state signals and control signals of controllable power electronic components in the DC control system, identifies the operation state of the power grid and controls the operation state of the DC power supply module and the magnetic energy absorbing module.

The DC power supply in the DC power supply module is the DC power supply provided by rectifying a single-phase or three-phase AC, or the DC power supply provided by dry batteries, or secondary batteries.

The DC power supply provided by rectifying a single-phase or three-phase AC includes one or more controllable power electronic switches that realize controllable output voltage and regulable output constant current.

The absorption branch consists of controllable power electronic switches being connected in parallel with magnetic energy absorbing elements.

The power electronic switches in the DC power supply module and the magnetic energy absorbing module are selected from one of Insulated Gate Bipolar Transistors (IGBT), Gate Turn-Off thyristors (GTO) and Integrated Gate-Commutated Thyristor (IGCT).

The magnetic energy absorbing elements in the absorption branch are one or a combination of some among Metal Oxide Varistor (MOV), Gas Discharge Tube (GDT), Solid Discharge Tube (SDT), or Transient Voltage Suppressor (TVS).

The follow current branch is composed of one or more diodes.

The iron core of the reactance system adopts the iron core structure with unequal cross-section. The iron core structure with unequal cross-section is a closed-shape iron core, including an excitation segment, a working segment and a conduction segment. Wherein, the ratio of the cross-section area of the excitation segment iron core to that of the working segment iron core falls between 1.01 and 10, and the ratio of the cross-section area of the excitation segment iron core to that of the conduction segment iron core falls between 1 and 10.

The closed-shape iron core can be a ring or polygon.

The number of sides in the polygon iron core may be 4~20.

The excitation segment is wound by superconductive windings, the working segment is wound by AC windings, and the conduction segment connects the excitation segment and the working segment.

The cross-section area of the conduction segment iron core is bigger than that of the working segment iron core, and less than or equal to that of the excitation segment iron core.

The shape of the cross section of the excitation segment iron core post is different from that of the working segment iron core post. 2~6 said excitation segment iron core posts are compactly assembled into an assembled center column around the center for 360°. There is provided an assembled insulation plate between every two adjacent excitation segment iron core posts. The outer contour of the assembled center column's section can have any one of the following shapes: circular, ellipse, runway, and rectangle or the like.

In the cross-section shape of the excitation segment iron core post, a circular arc of the outer contour of the assembled center column's section is located at the inner side of the rectangular-shape iron core. A wedge-shape is formed at the outer side of the rectangular-shape iron core. The other two sides are parallel straight sides.

The vertex angle of the wedge shape is 60°, 90°, 120° or 180°.

The superconductive magnet is connected in parallel with a voltage-clamp coil.

The voltage-clamp coil is a single copper, aluminum, or silver coil winding or a single resistor, or is a copper/aluminum coil winding connected with a resistor in series.

The ratio between the number of turns of the superconductive magnet and that of the voltage-clamp coil is equal to or bigger than 20.

To achieve the above purpose, the invention also provides a control method for the core-saturated superconductive fault current limiter. The method comprises the following steps:

1) The control module identifies the operation state of the power grid by processing electrical measurement signals received from the power mutual inductor in the power grid. The operation states include: normal operation state, short-circuit fault state and short-circuit fault recovery state;

2) When the control module identifies that the power grid operates in the normal operation state, it controls the controllable power electronic switches of the magnetic energy absorbing module to set it in a non-magnetic energy absorbing state. It also controls the controllable power electronic switches of the DC power supply module to set it in the low-voltage constant DC output state;

3) When the DC power supply module is in the low-voltage constant DC output state, the control module regulates the magnitude of the current in the superconductive magnet to match the load of the power grid, according to the load amount of the power grid. Then return to step 1). This cycle will be maintained until the operation state of the power grid changes;

4) When the control module identifies that the power grid is in the short-circuit fault state, it controls the controllable power electronic switches in the magnetic energy absorbing module to set it in the magnetic energy absorbing state. It also controls the controllable power electronic switches of the DC power supply module to interrupt its DC output. Then return to step 1). This cycle will be maintained until the operation state of the power grid changes;

5) When the control module identifies that the power grid is in the fault recovery state, it controls the controllable power electronic switches in the magnetic energy absorbing module to set it in the non-magnetic energy absorbing state. It also controls the controllable power electronic switches of the DC power supply module to set it in high-voltage DC output state. Then return to step 1). This cycle will be maintained until the operation state of the power grid changes.

The present invention has the following beneficial technical effects: the core-saturated superconductive fault current limiter proposed in this invention turns the passive current limiting into active current limiting, and thus improves the efficiency of current limiting compared with the traditional technology; the effect of magnetic leakage on iron cores is reduced by varying the structure, shape and size of the iron cores, to cancel the disadvantage caused by the magnetic leakage that is produced because of the iron cores entering saturation sate, so as to redistribute the magnetic potential on the iron cores. In the case that excitation magnetic potential stays unchanged or decreasing, the designed saturation of the iron cores can be realized. The current limiter according to this invention has better applicability in terms of technology and economics.

1 Power grid
2 Superconductive magnet
3 Load in the power grid
4 Iron core
5 AC winding
6 DC control system
7 Monitoring system
8 Power mutual inductor
9 Cryogenic system
10 Assembled insulation plate
11 Voltage-clamp coil
12 Resistor
41 Excitation segment
42 Working segment
43 Conduction segment
411 A Circular Arc
412 Wedge shape
413 Parallel straight side
414 Parallel straight side
61 DC power supply module
62 Magnetic energy absorbing module
63 Control module
621 Absorption branch
622 Follow current branch

DETAILED DESCRIPTION

In the following description, specific implementations and embodiments are illustrated in conjunction with the drawings.

Figure 1:
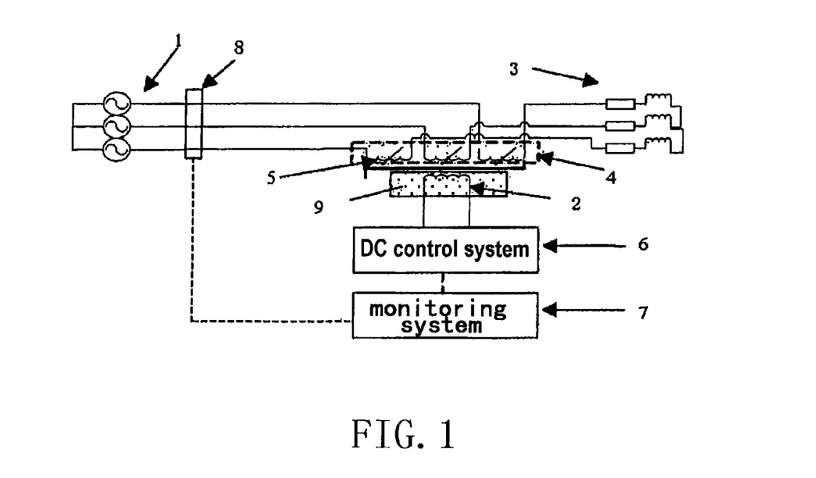
FIG. 1 is an overall schematic circuit diagram of the core-saturated superconductive fault current limiter according to the present invention.

FIG. 1 shows a schematic circuit diagram of a core-saturated superconductive fault current limiter according to the present invention. This invention provides a core-saturated superconductive fault current limiter, which is connected to the power supply in the power grid 1, and includes a superconductive magnet 2, an iron core 4 and an AC winding 5, and also includes a DC control system 6. The DC control system 6 is connected to the superconductive magnet 2 at both ends, and connected with a monitoring system 7 through a data cable.

Figure 2:
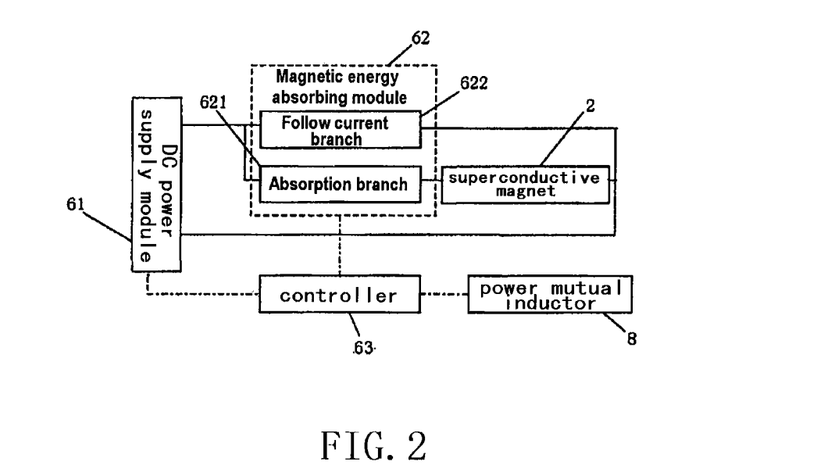
FIG. 2 is a schematic diagram of the DC control system.

As shown in FIG. 2 of a schematic circuit diagram of the DC control system, the DC control system 6 includes:

a DC power supply module 61, which has an output terminal;

a magnetic energy absorbing module 62 connected with the output terminal of the DC power supply module 61, which is composed of an absorption branch 621 and a follow current branch 622. The absorption branch 621 is connected to the superconductive magnet 2 in series, wherein the current flows in one direction; the follow current branch 622 is connected in parallel with the series circuit that consists of the absorption branch 621 and the superconductive magnet 2, and its current flows in a direction opposite to that in the absorption branch 621;

a control module 63, which connects the state data cable of the controllable electronic switches in the power mutual inductor 8 of the power grid, DC power supply module 61 and the magnetic energy absorbing module 62 through signal lines, receives electrical measurement signals in the power grid 1, and receives and transmits state signals and control signals of the controllable electronic components in the DC control system 6, identifies the operation state of the power grid 1 and controls the operation state of the DC power supply module 61 and the magnetic energy absorbing module 62.

Figure 3:
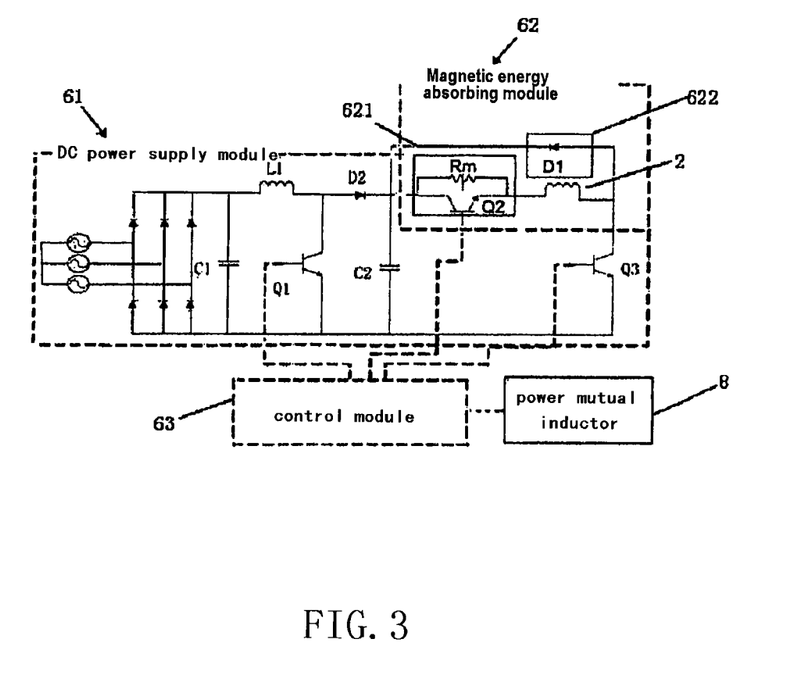
FIG. 3 is a schematic diagram of an application embodiment of the DC control system according to the present invention.

As shown in FIG. 3, the DC power supply in the DC power supply module 61 is a DC power supply provided by rectifying a single-phase or three-phase AC, wherein the DC power supply module 61 uses a controllable power electronic switch Q1, an inductance coil L1, a capacitor C2 and a diode D2 to control output voltage, and uses a controllable power electronic switch Q3 to realize the output constant current regulation. When the current limiter operates normally, the DC power supply module 61 outputs a lower DC voltage, to maintain the excitation current in the superconductive magnet 2. When the current limiter is in the recovery state, the DC power supply module 61 outputs a higher DC forcing voltage, so that the magnetic field in the superconductive magnet 2 can reach the excitation state rapidly.

The absorption branch 621 consists of a controllable power electronic switch Q2 connected in parallel with a magnetic energy absorbing component Rm. When the superconductive magnet 2 operates in the excitation state, the absorption branch 621 exhibits connectivity, corresponding to the short-circuit state. When the superconductive magnet 2 exits from the excitation state, the absorption branch 621 disconnects and absorbs the magnetic energy in the superconductive magnet 2, so as to limit the voltage across the superconductive magnet 2 to a safe level.

The magnetic energy absorbing component Rm in the absorption branch 621 is one or a combination of some among Metal Oxide Varistor (MOV), Gas Discharge Tube (GDT), Solid Discharge Tube (SDT), Transient Voltage Suppressor (TVS).

The follow current branch 622 is made up of one or more diodes D1. In the follow branch 622, the current flows in a single direction opposite to the direction of the current in the superconductive magnet 2. Hence, the follow branch 622 may be one or more diodes, which are connected in series, in parallel, or any combination of series-parallel connections, and may also be controllable electronic switches.

Figure 4:
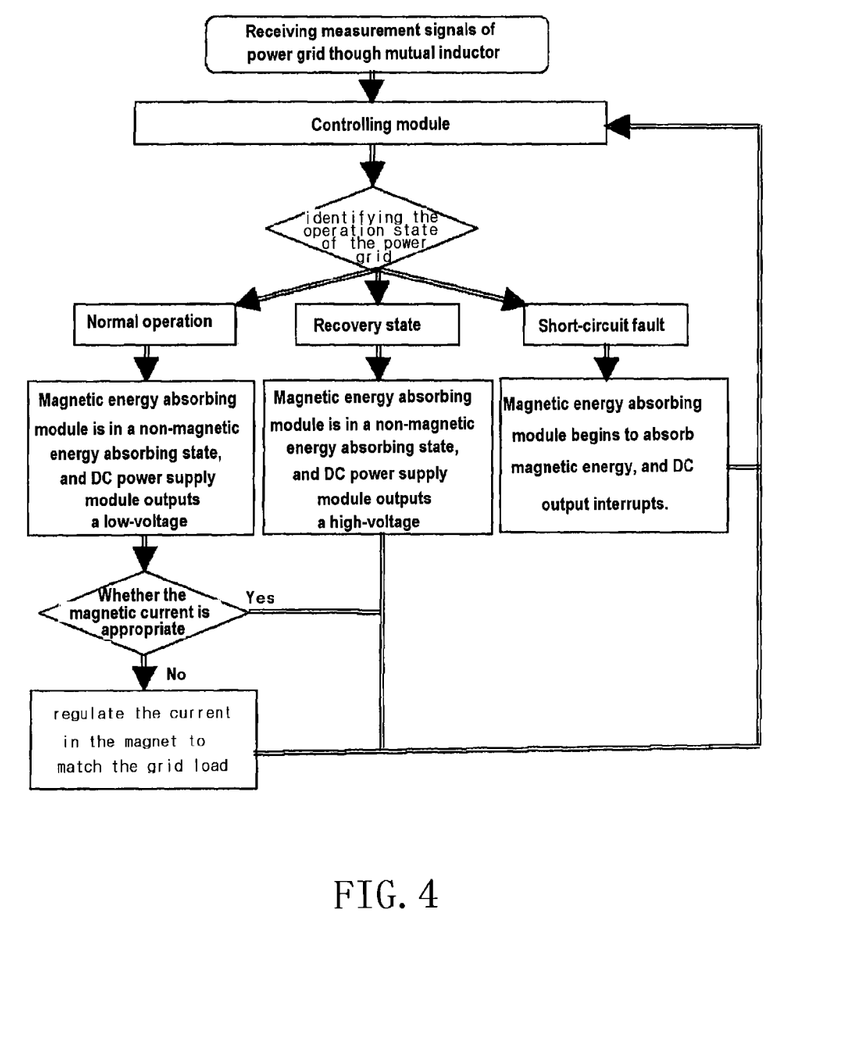
FIG. 4 shows a flow chart of steps of the control method for the DC control system according to the present invention.

The control module 63 can control the operation state of the DC power supply module 61 and magnetic energy absorbing module 62 respectively, according to the operation strategy of the current limiter. FIG. 4 shows a flow chart of steps of the control method for the DC control system, comprising the following steps:

1) The control module 63 identifies the operation state of the power grid by processing the electrical measurement signals received from the power mutual inductor 8 in the power grid. The operation state includes three distinctive states: normal operation state, short-circuit fault state, and short-circuit fault recovery state.

2) When the control module 63 identifies that the power grid is operating in the normal operation state, it controls the controllable electronic switches in the magnetic energy absorbing module 62 to set it in a non-magnetic energy absorbing state. It also controls the controllable electronic switches of the DC power supply module 61 to set it in the low-voltage constant DC output state.

3) When the DC power supply module 61 is in the low-voltage constant DC output state, the control module 63 regulates the current magnitude in the superconductive magnet 2 to match the load of the power grid, according to the load amount of the power grid. Then return to step 1). This cycle will be maintained until the operation state of the power grid changes.

4) When the control module 63 identifies that the power grid is in the short-circuit fault state, it controls the controllable power electronic switches in the magnetic energy absorbing module 62 to set it in the magnetic energy absorbing state; and it also controls the controllable electronic switches of the DC power supply module 61, to interrupt the DC output. Then return to step 1). This cycle will be maintained until the operation state of the power grid changes.

5) When the control module 63 identifies that the power grid is in the fault recovery state, it controls the controllable power electronic switches in the magnetic energy absorbing module 62 to set it in the non-magnetic energy absorbing state; and it also controls the power electronic switches of the DC power supply module 61 to set it in a high-voltage DC output state. Then return to step 1). This cycle will be maintained until the operation state of the power grid changes.

Figure 7:
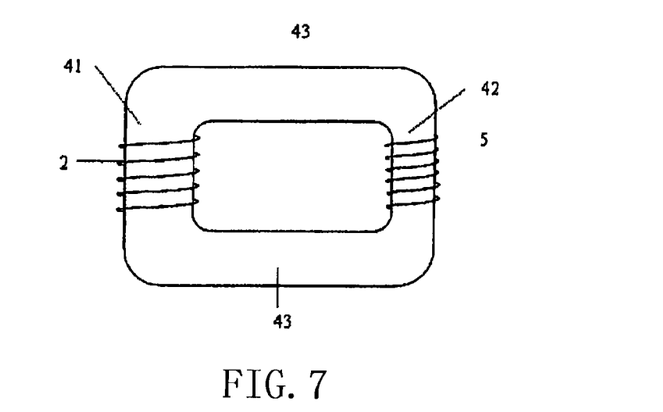
FIGS. 7, 8 and 9 show schematic diagrams of the iron core with unequal cross-section according to the present invention respectively, wherein AC windings are wound on different positions.

FIG. 7 is a schematic diagram of one exemplary embodiment of the invention, which shows a rectangular-shape iron core structure with unequal cross-section and wherein, the superconductive magnet 2 and the AC winding 5 are separately wound on two opposite sides. It provides an iron core structure with unequal cross-section for working at the magnetic unsaturated region. The iron core is a closed-shape iron core, including an excitation segment 41, a working segment 42, and a conduction segment 43. Wherein, the ratio of the cross-section area of the excitation segment 41 iron core to that of the working segment 42 iron core falls between 1.01 and 10, and the preferred ratio falls between 1.2 and 3. The ratio of the cross-section area of the excitation segment 41 iron core to that of the conduction segment 43 iron core falls between 1 and 10, and the preferred ratio falls between 1 and 3. The cross-section area of the conduction segment 43 iron core is bigger than that of the working segment 42 iron core, and less than or equal to that of the excitation segment 41 iron core. As shown in FIG. 7, in this embodiment, the cross-section area of the conduction segment 43 iron core is less than that of the excitation segment 41 iron core. The excitation segment 41 is wound by the superconductive magnet 2, the working segment 42 is wound by the AC winding 5, and the conduction segment 43 connects the excitation segment 41 and the working segment 42.

Figure 8:
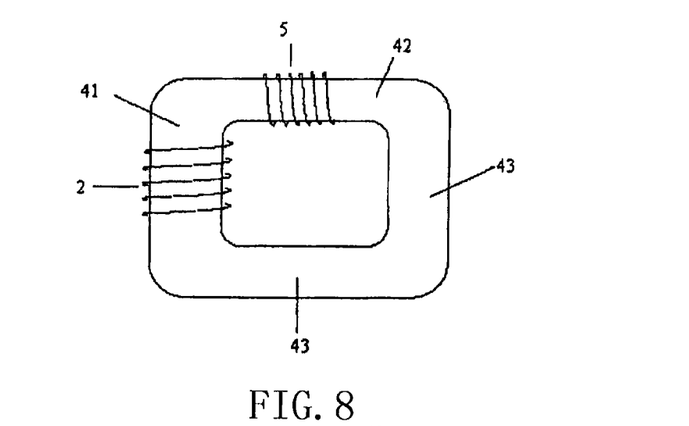
Figure 9:
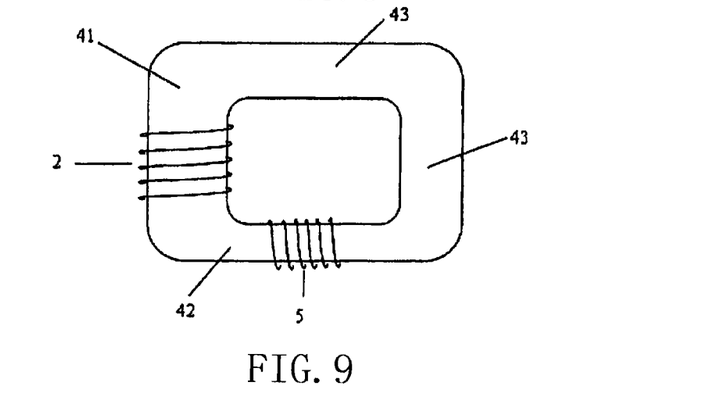

FIG. 8 and FIG. 9 are schematic diagrams of two exemplary embodiments of this invention, which shows a rectangular-shape iron core structure with unequal cross-section, and wherein, the superconductive magnet 2 and the AC winding 5 are separately wound on two adjacent sides. The iron core is a closed-shape iron core, including an excitation segment 41, a working segment 42, and a conduction segment 43. Wherein, the ratio of the cross-section area of the excitation segment 41 iron core to that of the working segment 42 iron core falls between 1.01 and 10, and the preferred ratio falls between 1.2 and 3. The ratio of the cross-section area of the excitation segment 41 iron core to that of the conduction segment 43 iron core falls between 1 and 10, and the preferred ratio falls between 1 and 3. The cross-section area of the conduction segment 43 iron core is bigger than that of the working segment 42 iron core, and less than or equal to that of the excitation segment 41 iron core. As shown in FIGS. 8 and 9, in this embodiment, the cross-section area of the conduction segment 43 iron core is less than that of the excitation segment 41 iron core. The excitation segment 41 is wound by the superconductive magnet 2, the working segment 42 is wound by the AC winding 5, and the conduction segment 43 connects the excitation segment 41 and the working segment 42.

Figure 10:
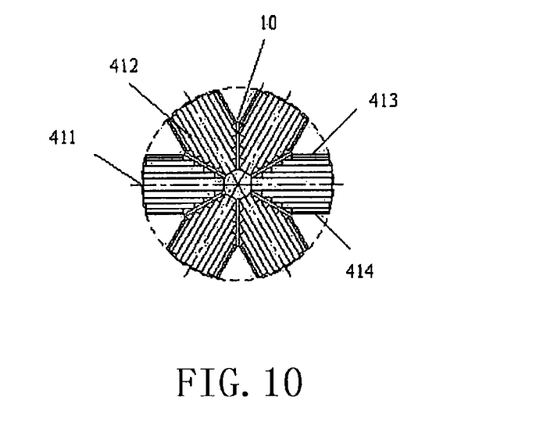
FIG. 10 is a schematic diagram of the cross section of an assembled center column that is formed by compactly assembling six excitation segment iron core posts.

As shown in FIG. 10, six said excitation segment iron core posts are compactly assembled together into an assembled center column around the center for 360°. There is provided an assembled insulation plate 10 between every two adjacent excitation segment iron core posts 41. The outer contour of the combined center column's cross-section is circular.

Figure 11:
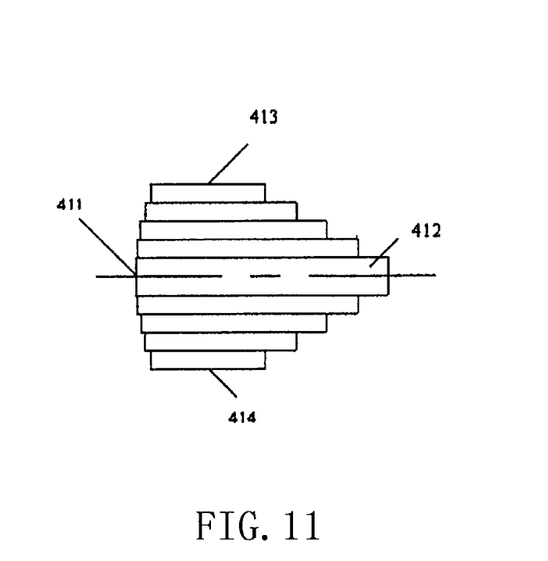
FIG. 11 shows the magnified schematic diagram of the section of one wedge-shaped excitation segment iron core post.

FIG. 11 shows the magnified schematic diagram of one wedge-shaped section of the assembled center column formed with six compactly assembled excitation segment iron core posts. By this example, in the cross-section shape of the excitation segment iron core post 41, a circular arc 411 of the outer contour of the assembled center column's section is located at the inner side of the rectangular-shape iron core. A wedge shape 412 is formed at the outer side of the rectangular-shape iron core. And the other two sides are parallel straight sides 413,414.

Figure 14:
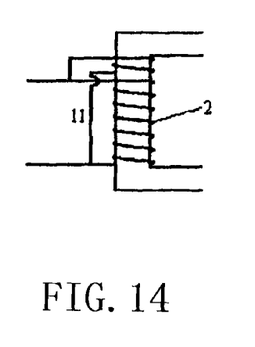
FIG. 14 shows a schematic diagram of the structure of a voltage-clamp coil in an embodiment.
Figure 15:
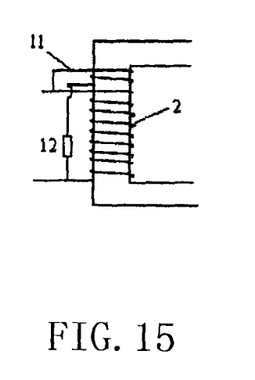
FIG. 15 shows another schematic diagram of the structure of a voltage-clamp coil.

FIG. 14 shows the schematic diagram of the structure about the superconductive magnet 2 connected in parallel with a voltage-clamp coil 11, wherein the voltage-clamp coil's number of turns is far smaller than that of the superconductive magnet. Thus, the equivalent number of turns of the parallel structure composed of the superconductive magnet and the voltage-clamp coil is significantly decreased compared with that of the superconductive magnet, so that the induction voltage taken by the superconductive magnet is reduced. When the superconductive magnet is powered, the current provided by the DC constant power supply only passes through the superconductive magnet, due to its null resistance, and thus the parallel voltage-clamp coil does not affect the normal excitation function of the superconductive magnet. FIG. 15 shows the other schematic diagram of the structure about the superconductive magnet 2 connected in parallel with a voltage-clamp coil 11. According to specific requirements, the voltage-clamp coil may also be connected in series with a resistor R12 first, and then connected in parallel with the superconductive magnet.

As follows, the core-saturated superconductive fault limiter DC control system and the iron core structure with unequal cross-section will be further illustrated in conjunction with a practical embodiment.

FIG. 3 shows a detailed circuit diagram of the DC control system for a 35 kV superconductive fault current limiter. Wherein, the DC power supply module 61 uses a three phase full bridge to rectify three phase 380V AC and then outputs a DC current with the voltage of 550V. The DC power supply module 61 uses the controllable power electronic switch Q1, the inductance coil L1, the capacitor C2 and the diode D2 to control its output voltage, and then realizes the constant current regulation through the controllable power electronic switch Q3.

In this exemplary embodiment, the detailed configuration, principle and function of the DC control system of the core-saturated superconductive fault current limiter are as follows:

1) DC Power Supply Module 61

In this embodiment, a pulsed DC is output by rectifying a single phase or three phase AC through a power electronic switch rectifier. The harmonic waves in the power supply output are removed by a filter capacitor C1 that is connected in parallel at the rear.

The output rear of the DC power supply is connected in parallel with a switch BOAST booster circuit, which is composed of an inductor L1, a power electronic switch Q1, a diode D2, a filter/energy storage capacitor C2. The magnitude of the output voltage can be controlled through a PWM power electronic switch Q1 to realize the controllable voltage.

When the current limiter is operating normally, the DC power supply module 61 outputs a lower voltage by pulse-width modulating the duty factor of the power electronic switch Q1 through the PWM, to maintain the excitation current in the superconductive magnet 2. When the current limiter operates in the recovery state, the DC power supply module 61 outputs a higher DC forcing voltage by pulse-width modulating the duty factor of the power electronic switch Q1 through the PWM to cause the magnetic field in the superconductive magnet 2 to reach the excitation state rapidly.

The power electronic switch Q3 is used to regulate and switch off the output of the DC power supply, which is controlled by the control module 63. It uses a PWM to pulse-width modulate and control the duty factor of the power electronic switch Q3 so as to adjust the current value in the superconductive magnet 2.

The power electronic switches Q1 and Q3 can be composed of one or more Insulated Gate Bipolar Transistors (IGBT), Gate Turn-Off thyristors (GTO) or Integrated Gate-Commutated Thyristor (IGCT), which are connected in series or in parallel.

2) Magnetic Energy Absorbing Module 62

The magnetic energy absorbing module 62 consists of the absorption branch 621 and the follow current branch 622. The absorption branch 621 is connected with the superconductive magnet 2 in series, and in this branch the current flows in a single direction. The follow current branch 622 connects in parallel with the series circuit that consists of the absorption branch 621 and the superconductive magnet 2, and its current flows in the opposite direction to that in the absorption branch 621.

According to FIG. 3, the absorption branch 621 consists of the power electronic switch Q2 connected in parallel with a MOV Rm, and is connected in series with the superconductive magnet 2 in one circuit.

The component group composed of the power electronic switch Q1 and the MOV Rm connected in parallel includes at least one power electronic switch and MOV Rm connected in parallel or a plurality of power electronic switches and MOV Rms connected in parallel. The MOV Rm in the absorption branch may be one of high energy MOV, GDT, SDT, TVS and the like.

According to FIG. 3, the follow current branch 622 is made up of one diode D1. In the follow current branch 622, the current flows in an opposite direction to the current in the superconductive magnet 2, used for follow current.

According to the requirements, the follow current branch 622 may also consist of a plurality of diodes, which are connected in series, in parallel, or in any combination of series-parallel connections. Moreover, the diode D1 may also be replaced by controllable power electronic components.

When the current limiter exists from the excitation state, it sends a signal to the power electronic switch Q3 as shown in FIG. 2-2 to switch off the output of the power supply. At this time, the superconductive magnet 2 forms follow current through diodes D1 and Q2. Switching off the Q3 and Q2 simultaneously generates a transient high voltage at two ends of the superconductive magnet 2, which is applied across the Q2. At this point, the MOV Rm discharges and clamps the voltage on the two ends of the superconductive magnet 2 at the same time. Thus the magnetic energy in the superconductive magnet 2 is released, while the power electronic switch Q2 is protected from the high voltage damage.

3) Control Module 63

The control module 63 as shown by the dotted line block in FIG. 3, is connected to the data cable of the power electronic components of the power mutual inductor 8 in the power grid, DC power supply module 61, and the magnetic energy absorbing module 62 through the data control lines. It is used for processing the received data, and controls the operation state of the power electronic components in the DC power supply module 61 and the magnetic energy absorbing module 62.

Figure 12:
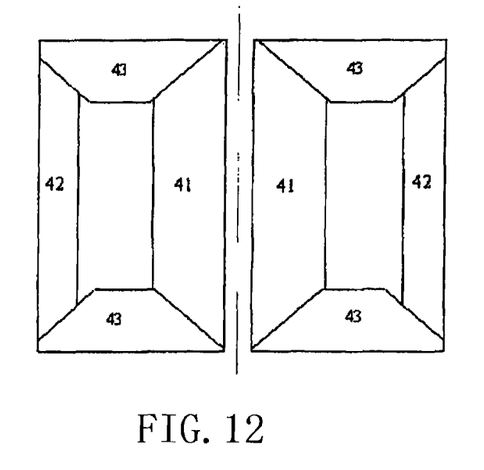
FIG. 12 shows the front view of the iron core with unequal cross-section according to the present invention.

FIG. 12 shows a front view of the embodiment of a three phase current limiter that is composed of six rectangular-shape iron cores. The six iron cores shown in the figure are all rectangular-shape (quadrangle) or the like. It includes an excitation segment 41, a working segment 42, and a conduction segment 43. Wherein, the ratio of the cross-section area of the excitation segment 41 iron core to that of the working segment 42 iron core falls between 1.01 and 10, and the preferred ratio falls between 1.2 and 3. In this embodiment, the ratio is approximately 2. The ratio of the cross-section area of the excitation segment 41 iron core to that of the conduction segment 43 iron core falls between 1 and 10, and the preferred ratio falls between 1 and 3. In this embodiment, the ratio is 1. In addition, the cross-section area of the conduction segment 43 iron core is bigger than that of the working segment 42 iron core, and less than or equal to that of the excitation segment 41 iron core. As shown in FIG. 12, in this embodiment, the cross-section area of the conduction segment 43 iron core is equal to that of the excitation segment 41 iron core.

Figure 13:
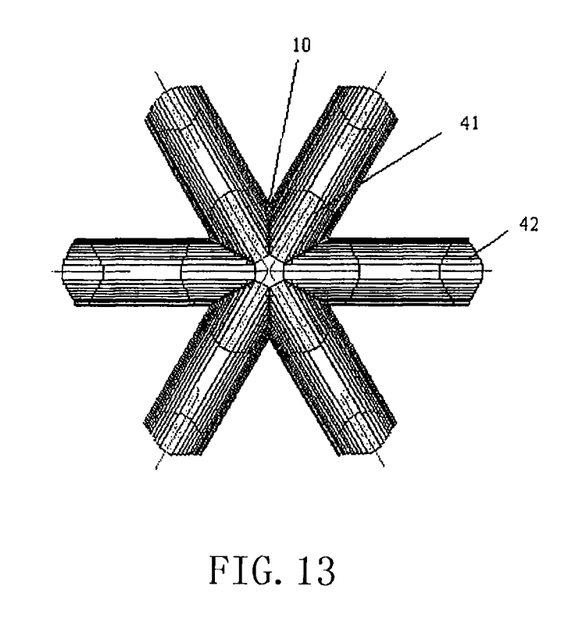
FIG. 13 shows the top view of the iron core with unequal cross-section according to the present invention.

FIG. 13 shows a top view of the embodiment of a three phase current limiter, which is composed of six rectangular-shape iron cores. The excitation segment 41 iron core post has different cross-section shape from the working segment 42 iron core post. Six said excitation segment iron core posts are compactly assembled into an assembled center column around the center for 360°. There is provided an assembled insulation plate 10 between every two adjacent excitation segment iron core posts 41. The outer contour of the assembled center column's cross-section is circular. The wedge-shaped excitation segment iron core post 41 with six-iron core structure has a vertex angle of 60°.

The present invention adopts power electronic control technology to turn a superconductive fault current limiter into an active current limiter, and thus enhances the current limiting efficiency. Moreover, it also utilizes the iron core structure with unequal cross-section so that the working iron core can reach the saturation required in the design. In addition, the bias magnetic potential provided by the superconductive winding is lower than that in the prior art, thus significantly reduces the size of the iron cores.

The invention claimed is:

1. A core-saturated superconductive fault current limiter, comprising:
   a cryostat system;
   an iron core formed by a plurality of iron core structures, each iron core structure comprising a closed shape having a plurality of sides, wherein a first side of each iron core structure has a cross-sectional area that is different than the cross-sectional area of a second side, and wherein the second side of each iron core structure includes an AC winding;
   a superconductive magnet within the cryostat system, the superconductive magnet comprising a superconductive winding around the first side of each iron core structure; and
   a monitoring system; and
   a DC control system connected to the superconductive magnet at both ends, and connected with the monitoring system through a data cable.

2. The core-saturated superconductive fault current limiter according to claim 1, wherein the DC control system includes:
   a DC power supply module, which has an output terminal;
   a magnetic energy absorbing module connected with the output terminal of the DC power supply module, which includes an absorption branch and a follow current branch; the absorption branch is connected with the superconductive magnet in series, in which the current flows in a single direction; the follow current branch is connected in parallel with the series circuit that consists of the absorption branch and the superconductive magnet, and its current flows in a direction opposite to that in the absorption branch;
   a control module, which connects state data lines of the controllable power electronic switches in a power mutual inductor of a power grid, the DC power supply module, and the magnetic energy absorbing module through signal lines, and which receives electrical measurement signals of the power grid and the control system, identifies the operation state of the power grid and controls the operation state of the DC power supply module and the magnetic energy absorbing module.

3. The core-saturated superconductive fault current limiter according to claim 2, wherein the DC power supply in the DC power supply module is the DC power supply provided by rectifying a single-phase or three-phase AC or the DC power supply provided by dry batteries or secondary batteries.

4. The core-saturated superconductive fault current limiter according to claim 3, wherein, the DC power supply provided by rectifying a single-phase and three-phase AC includes a controllable power electronic switch that is used to realize controllable output voltage and regulable output constant current.

5. The core-saturated superconductive fault current limiter according to claim 2, wherein, the absorption branch comprises controllable power electronic switches being connected in parallel with magnetic energy absorbing elements.

6. The core-saturated superconductive fault current limiter according to claim 4 or 5, wherein, the controllable power electronic switches are selected from a group consisting of an Insulated Gate Bipolar Transistors IGBT, an Integrated Gate-Commutated Thyristor IGCT and a Gate Turn-Off thyristors GTO.

7. The core-saturated superconductive fault current limiter according to claim 5, wherein, the magnetic energy absorbing elements are selected from a group consisting of a Metal Oxide Varistor, a Gas Discharge Tube, a Solid Discharge Tube (SDT), a Transient Voltage Suppressor, and a combination thereof.

8. The core-saturated superconductive fault current limiter according to claim 2, wherein, the follow current branch comprises at least one diode.

9. The core-saturated superconductive fault current limiter according to claim 1,
   wherein the first side of each iron core structure is connected to the second side by one or more conduction segments, each conduction segments comprising one or more sides of the closed shape;
   wherein the ratio of the cross-sectional area of the first side to that of the second side is between 1.01 and 10, and the ratio of the cross-sectional area of the first side to that of each of the one or more sides of the one or more conduction segments is between 1 and 10.

10. The core-saturated superconductive fault current limiter according to claim 9, wherein, the closed-shape of the iron core structure is a ring or a polygon.

11. The core-saturated superconductive fault current limiter according to claim 10, wherein, the number of sides in the polygon shaped iron core structure is between 4 and 20.

12. The core-saturated superconductive fault current limiter according to claim 9, wherein the first side is adjacent to the second side in the iron core structure such that one end of the first side is connected directly to one end of the second side.

13. The core-saturated superconductive fault current limiter according to claim 9, wherein, the cross-sectional area of each of the one or more sides of the one or more conduction segments is bigger than that of the second side, and less than or equal to that of the first side.

14. The core-saturated superconductive fault current limiter according to claim 9, wherein,
   the shape of the cross section of the first side is different from that of the second side;
   between two and six of the iron core structures are compactly assembled with the first side of each iron core structure being positioned to form an assembled center column with the second side of each iron core being positioned 360° around the assembled center column;

there is provided an assembled insulation plate between every two first sides; and the closed shape of each iron core structure is selected from a group consisting of a circle, an ellipse, a runway, and a rectangle.

15. The core-saturated superconductive fault current limiter according to claim 14, wherein the closed shape of each iron core structure is a rectangle, and wherein the shape of the cross section of each first side comprises an interior side positioned on the inside of the closed rectangle shape, a first exterior side positioned opposite the interior side, and a third and fourth side that connect the interior side to the first exterior side, wherein the interior side has a circular arc shape, the first exterior side has a wedge shape, and the third and fourth sides are parallel.

16. The core-saturated superconductive fault current limiter according to claim 15, wherein, the vertex angle of the wedge shape is one of 60°, 90°, 120° and 180°.

17. The core-saturated superconductive fault current limiter according to claim 1, wherein, the superconductive magnet is connected in parallel with a voltage-clamp winding.

18. The core-saturated superconductive fault current limiter according to claim 17, wherein, the voltage-clamp coil is at least one of a single copper, aluminum, silver coil winding, a single resistor, and a copper/aluminum coil winding connected with a resistor in series.

19. The core-saturated superconductive fault current limiter according to claim 17, wherein, the ratio between the number of turns of the superconductive magnet and that of the voltage-clamp coil is equal to or greater than 20.

20. A control method for a core-saturated superconductive fault current limiter, including the following steps:

1) identifying the operation state of the power grid by processing electrical measurement signals received from the power mutual inductor in the power grid, the operation states including a normal operation state, a short-circuit fault state and a short-circuit fault recovery state;

2) when the control module identifies that the power grid operates in the normal operation state, controlling the controllable power electronic switches of the magnetic energy absorbing module to set it in a non-magnetic energy absorbing state, and controlling the controllable power electronic switches of the DC power supply module to set it in the low-voltage constant DC output state;

3) when the DC power supply module is in the low-voltage constant DC output state, regulating the magnitude of the current in the superconductive magnet to match the load of the power grid, according to the load amount of the power grid, returning to step 1), and maintaining this cycle until the operation state of the power grid changes;

4) when the control module identifies that the power grid is in the short-circuit fault state, controlling the controllable power electronic switches in the magnetic energy absorbing module to set it in the magnetic energy absorbing state, controlling the controllable power electronic switches of the DC power supply module to interrupt its DC output, returning to step 1), and maintaining this cycle until the operation state of the power grid changes; and 5) when the control module identifies that the power grid is in the fault recovery state, controlling the controllable power electronic switches in the magnetic energy absorbing module to set it in the non-magnetic energy absorbing state, controlling the controllable power electronic switches of the DC power supply module to set it in high-voltage DC output state, returning to step 1), and maintaining this cycle until the operation state of the power grid changes.

\* \* \* \* \*